United States Patent
Black et al.

(10) Patent No.: US 12,472,110 B2
(45) Date of Patent: Nov. 18, 2025

(54) EXTENSIBLE COMPOSITE HAVING RIBS

(71) Applicant: APLIX, Le Cellier (FR)

(72) Inventors: Kevin P Black, Rock Hill, SC (US); Alexander James Neeb, Charlotte, NC (US); Geoffrey Boyd McGregor, Clover, SC (US)

( * ) Notice: Subject to any disclaimer, the term of this patent is extended or adjusted under 35 U.S.C. 154(b) by 327 days.

(21) Appl. No.: 18/224,631

(22) Filed: Jul. 21, 2023

(65) Prior Publication Data

US 2024/0024168 A1 Jan. 25, 2024

Related U.S. Application Data

(60) Provisional application No. 63/391,817, filed on Jul. 25, 2022.

(51) Int. Cl.
*A61F 13/49* (2006.01)
*A61F 13/15* (2006.01)

(52) U.S. Cl.
CPC .. *A61F 13/49011* (2013.01); *A61F 13/15585* (2013.01); *A61F 13/4902* (2013.01); *A61F 2013/49031* (2013.01); *A61F 2013/49098* (2013.01)

(58) Field of Classification Search
CPC .......... A61F 13/15203; A61F 13/15585; A61F 13/49001; A61F 13/49011; A61F 13/4902; A61F 13/532; A61F 13/533; A61F 13/534; A61F 13/535; A61F 13/536; A61F 13/539; A61F 2013/530562
See application file for complete search history.

(56) References Cited

U.S. PATENT DOCUMENTS

| | | | | |
|---|---|---|---|---|
| 4,578,068 A | * | 3/1986 | Kramer | A61F 13/536 428/206 |
| 5,221,274 A | * | 6/1993 | Buell | A61F 13/15707 604/385.3 |
| 5,628,741 A | * | 5/1997 | Buell | A61F 13/15593 604/385.27 |
| 6,605,172 B1 | * | 8/2003 | Anderson | B32B 27/12 156/199 |
| 2007/0105472 A1 | | 5/2007 | Marche | |
| 2014/0378924 A1 | | 12/2014 | Turner et al. | |

FOREIGN PATENT DOCUMENTS

| | | |
|---|---|---|
| EP | 1783257 A1 | 5/2007 |
| WO | 0037003 A2 | 6/2000 |
| WO | 2019086344 A1 | 5/2019 |

* cited by examiner

*Primary Examiner* — Philip R Wiest

(57) ABSTRACT

An extensible composite including a first layer and a second layer, the first layer having a first layer first surface and a first layer second surface opposing the first layer first surface, the first layer being constructed of a non-woven material, the second layer having a second layer first surface facing the first layer first surface and a second layer second surface opposing the second layer first surface, the second layer being constructed of an elastomeric material and including a plurality of ribs extending from at least the second layer first surface, wherein at least a portion of the first layer first surface is attached to the second layer first surface at a plurality of attachment positions and the first layer and the second layer are configured to define a space between the first layer first surface and the second layer first surface between adjacent attachment positions.

27 Claims, 5 Drawing Sheets

[Fig. 1A]
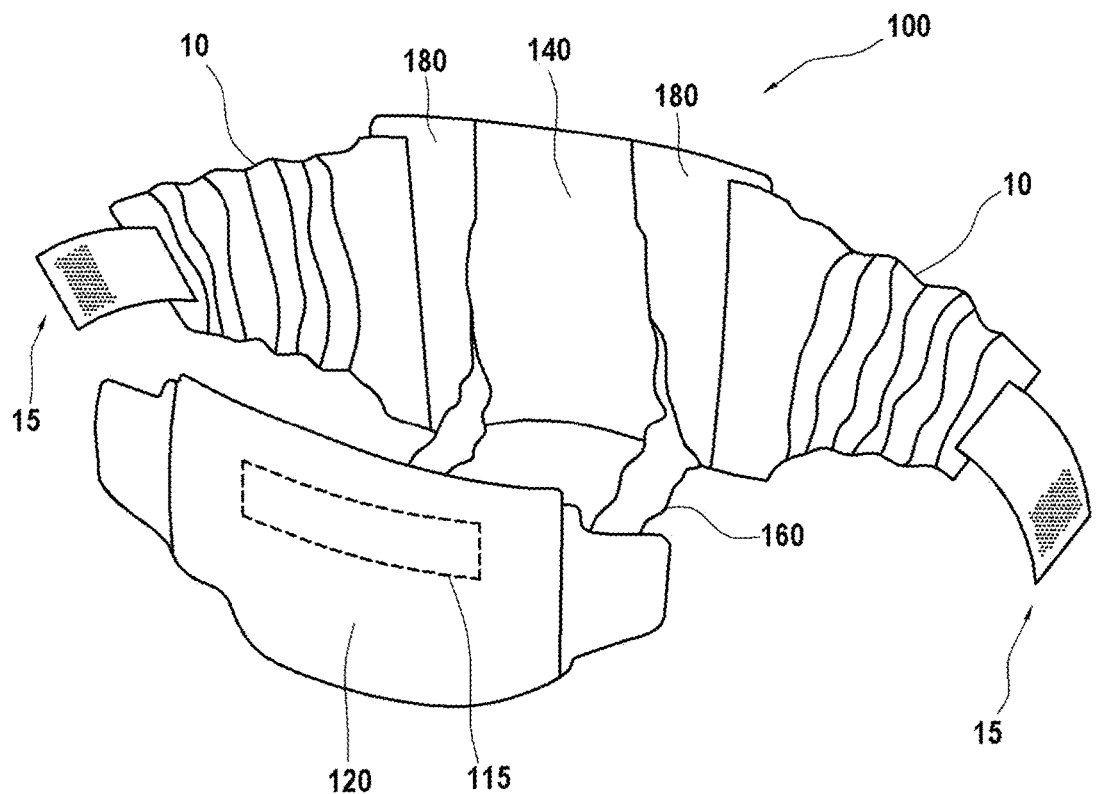
[Fig. 1B]
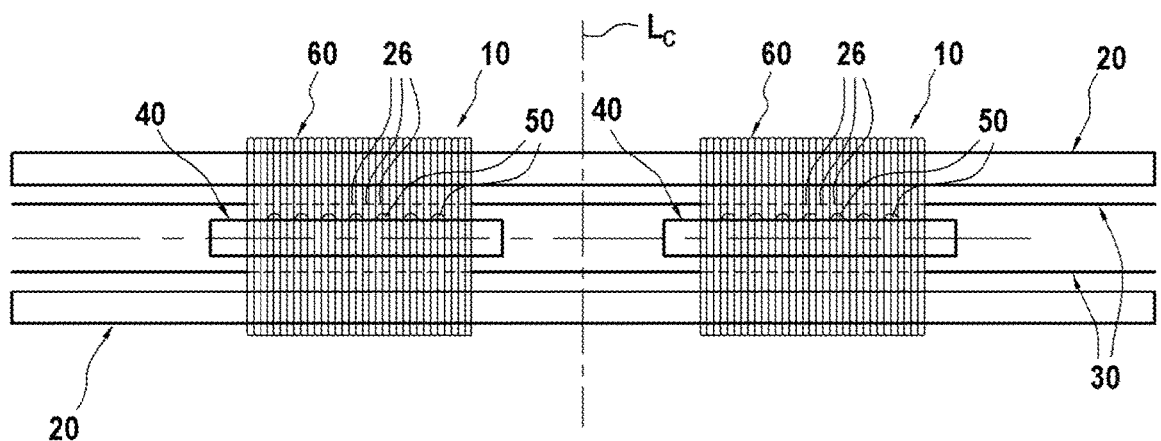

[Fig. 2]
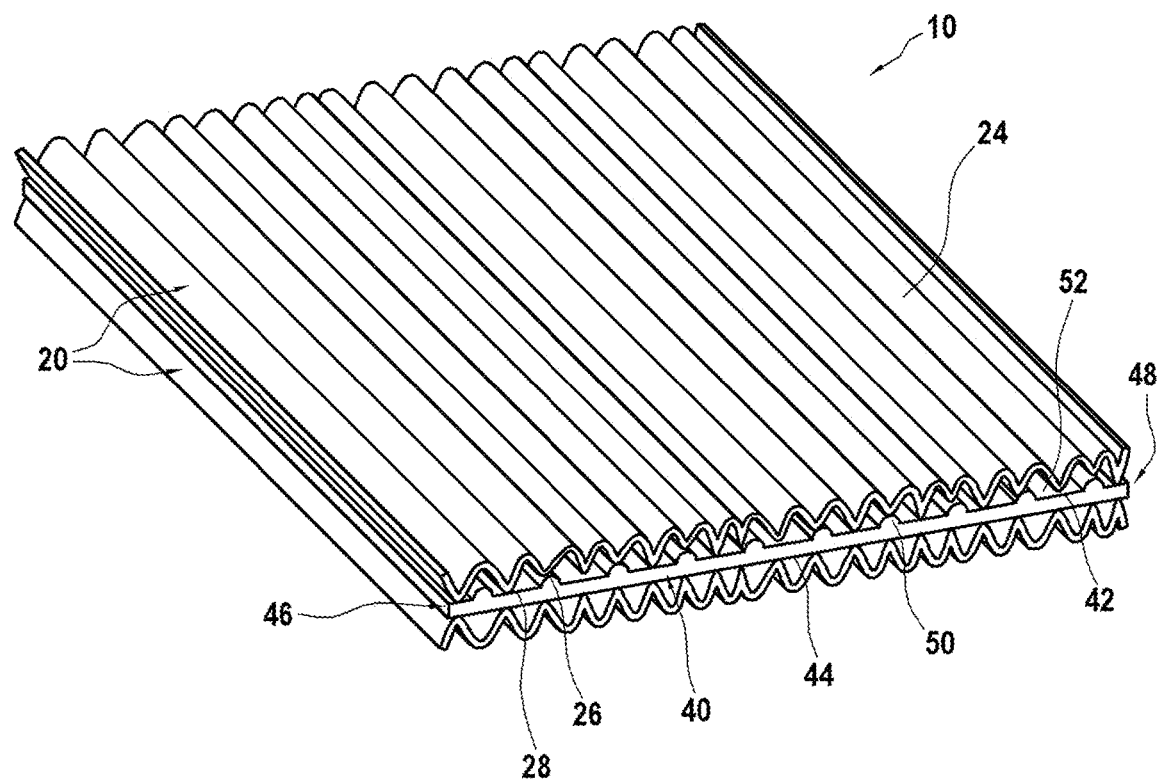
[Fig. 3]
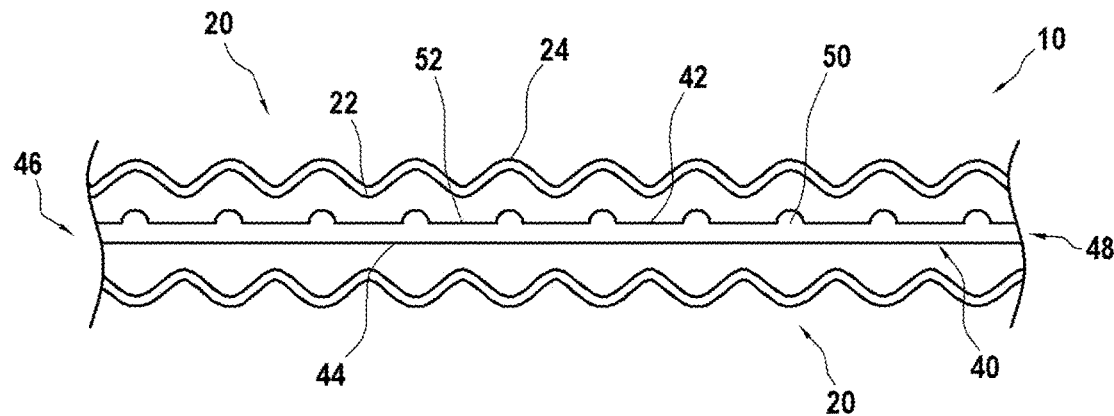

[Fig. 4A]
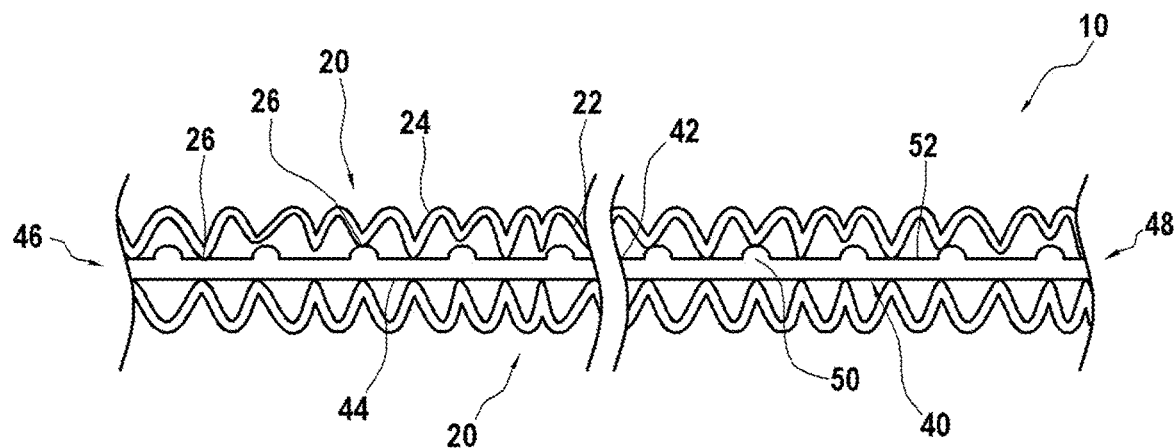
[Fig. 4B]
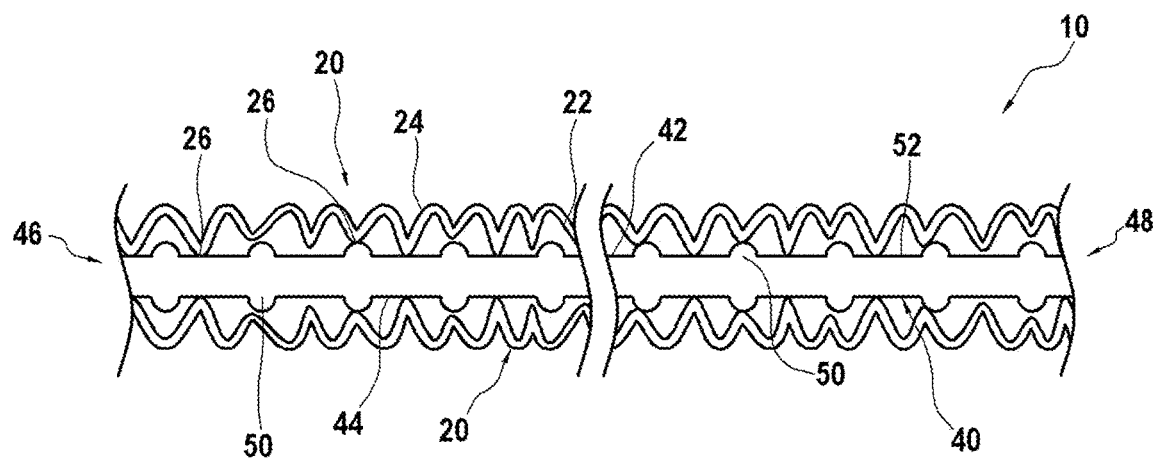

[Fig. 5A]
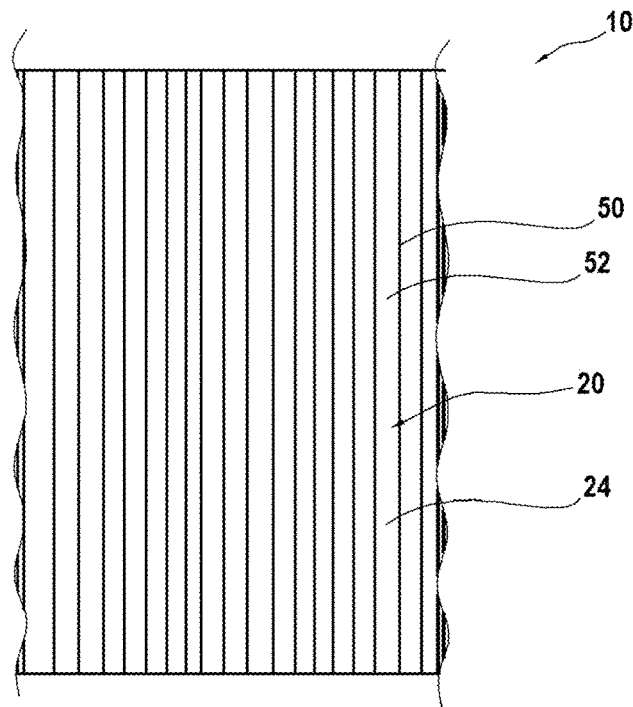
[Fig. 5B]
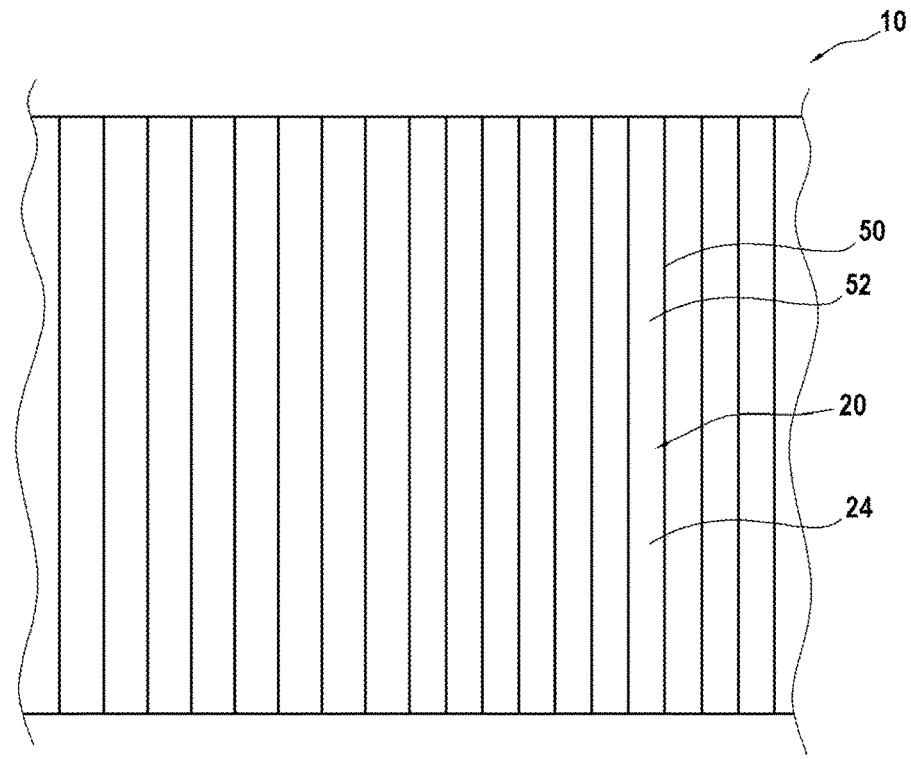

[Fig. 6A]
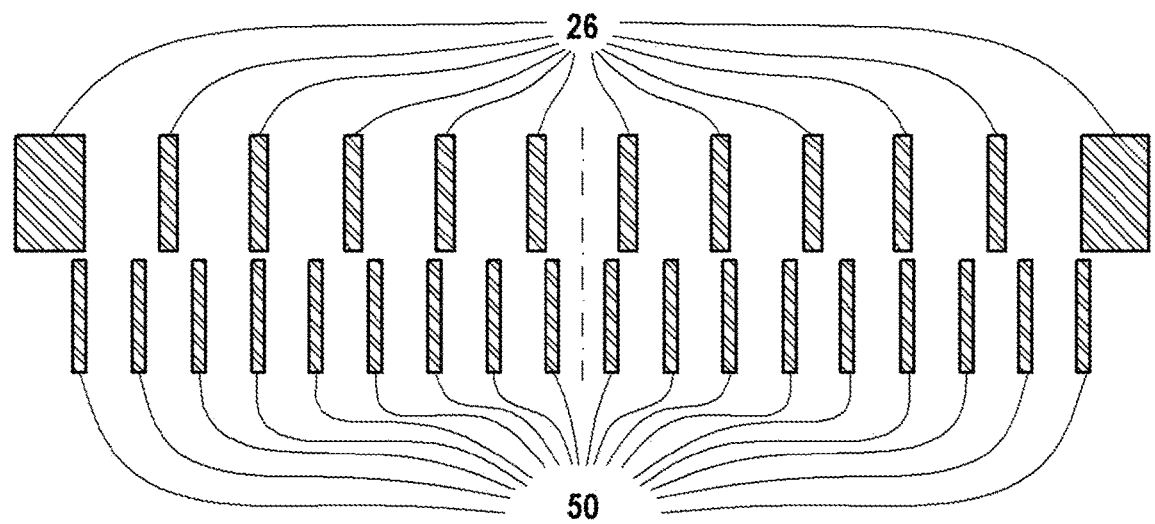
[Fig. 6B]
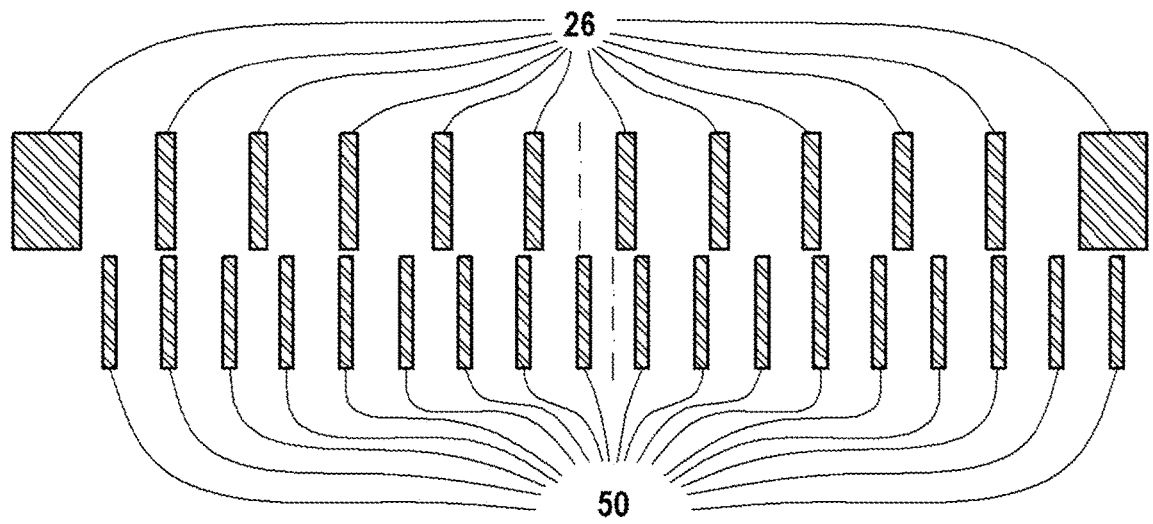

EXTENSIBLE COMPOSITE HAVING RIBS

CROSS REFERENCE TO RELATED APPLICATIONS

This application claims priority to U.S. Provisional application No. 63/391,817 filed on Jul. 25, 2022. The contents of which are hereby incorporated by reference herein.

FIELD

The present disclosure relates to the field of hygienic and/or disposable garments. Particularly, the present disclosure relates to an extensible composite configured for use on a hygienic and/or disposable garment.

BACKGROUND

A typical hygienic and/or disposable garment, such as a diaper and/or the like, may be a type of underwear configured to be worn on a midsection of a user, in order to collect, absorb, and/or contain waste product of the user, so as to prevent soiling of outer clothing of the user and/or a surrounding environment of the user. The hygienic garment may be worn users including infants and toddlers who are not yet toilet trained; adults experiencing medical conditions, such as incontinence; adults working in extreme conditions, such as astronauts; and/or the like. To this end, it is imperative that the hygienic garment be comfortable and facilitates ease of use.

At least a portion of the hygienic garment may include an extensible component configured to allow fastening of the hygienic garment about the midsection of the user and/or to allow sliding of the hygienic garment up to the midsection of the user, so as to provide a secure and modifiable fit of the hygienic garment about the midsection of the user. The extensible component of the hygienic garment may be a composite that includes at least a non-woven layer configured to be grasped by a user and/or to come into contact with the skin of a user and an elastic film configured to expand and contract.

Currently available extensible components and, thus, hygienic garments, typically include non-woven layers that are flat, which results in less cushioning, texture, and absorbency of the extensible component and, thus, the hygienic garment. Additionally, currently available extensible components and, thus, hygienic garments, typically include elastic films that are flat, which results in less structural integrity of the extensible component, as well as less visual recognition by the user of expansion and contraction of the extensible component.

It is desirable to provide an extensible component configured for use on a hygienic garment that is configured to increase adjustability, cushioning, texture, and absorbency of the hygienic garment, while also providing a visual indication of elongation of the extensible component, in order to ensure comfortability and ease of use extensible component and, thus, the hygienic garment.

SUMMARY

According to aspects of the present disclosure, an extensible composite and/or stretch laminate is provided, in particular an extensible composite and/or stretch laminate configured for use on a hygienic garment and/or the like is provided. The extensible composite includes a first layer having a first layer first surface and a first layer second surface opposing the first layer first surface, the first layer including a non-woven material, and a second layer having a second layer first surface facing the first layer first surface and a second layer second surface opposing the second layer first surface, the second layer including an elastomeric material, wherein the second layer includes a plurality of ribs extending from at least the second layer first surface, and wherein at least a portion of the first layer first surface is attached to the second layer first surface at a plurality of attachment positions and the first layer and the second layer are configured to define a space between the first layer first surface and the second layer first surface between adjacent attachment positions of the plurality of attachment positions.

According to aspects of the disclosure, the first layer and the second layer may be configured to extend and contract between a relaxed state and an extended state.

According to aspects of the disclosure, the first layer may include a first mean distance between adjacent ribs of the plurality of ribs in the relaxed state, the first layer may include a second mean distance between adjacent ribs of the plurality of ribs in the extended state, and the second mean distance between adjacent ribs of the plurality of ribs may be greater than the first mean distance between adjacent ribs of the plurality of ribs.

According to aspects of the disclosure, a gap may extend between adjacent ribs of the plurality of ribs of the second layer.

According to aspects of the disclosure, the second layer may have a first thickness within each gap of the second layer and a second thickness along each rib of the plurality of ribs of the second layer, and the second thickness along each rib of the plurality of ribs of the second layer may be greater than the first thickness within each gap of the second layer.

According to aspects of the disclosure, the first thickness of the second layer within each gap of the second layer may be within a range of 10% to 50% of the second thickness of the second layer along each rib of the plurality of ribs of the second layer, in particular, in the relaxed state, and more particular within a range of 20% to 45%, especially in the relaxed state. The thickness of the second layer is typically observed from a photo obtained with a digital microscope from Keyence Corporation under the reference "VHX 6000," e.g., at ×200 magnification, and measurements are obtained with digital microscope image analysis software.

According to aspects of the disclosure, the second layer may include an inner sublayer encapsulated by two outer sublayers, each forming a skin-layer for protecting the inner sublayer. The plurality of ribs may be formed by one or both of the outer sublayers and/or by the inner sublayer. According to another aspect of the disclosure, the second layer may not include a skin-layer for protecting the inner sublayer, and may be a layer of elastomeric film.

According to aspects of the disclosure, one or more attachment position of the plurality of attachment positions may be located between adjacent ribs of the plurality of ribs of the second layer.

According to aspects of the disclosure, one or more attachment position of the plurality of attachment positions may be located along at least a portion of one or more rib of the plurality of ribs of the second layer.

According to aspects of the disclosure, one or more attachment position of the plurality of attachment positions may be located between adjacent ribs of the plurality of ribs of the second layer and one or more attachment position of the plurality of attachment positions may be located along at least a portion of one or more rib of the plurality of ribs of the second layer.

According to aspects of the disclosure, at least 1% to 10% of the plurality of attachment positions between the first layer and the second layer may be located along at least a portion of a rib of the plurality of ribs of the second layer.

According to aspects of the disclosure, at least 5% to 40% of the plurality of attachment positions between the first layer and the second layer may be located between adjacent ribs of the plurality of ribs of the second layer.

According to aspects of the disclosure, in a cross-section in a plane perpendicular to a machine direction or cross-machine direction, at least 1% of the plurality of attachment positions between the first layer and the second layer may be located along at least a portion of a rib of the plurality of ribs of the second layer and up to 99% of the plurality of attachment positions may be located between adjacent ribs of the plurality of ribs of the second layer.

According to aspects of the disclosure, in a cross-section in a plane perpendicular to a machine direction or a cross-machine direction, up to 20% of the plurality of attachment positions between the first layer and the second layer may be located along at least a portion of a rib of the plurality of ribs of the second layer and at least 80% of the plurality of attachment positions may be located between adjacent ribs of the plurality of ribs of the second layer.

According to aspects of the disclosure, the second layer may include a second layer first end and a second layer second end and the plurality of ribs of the second layer extend continuously, in particular in a linear pattern, and more particularly in a straight linear pattern, throughout the second layer between the second layer first end and the second layer second end, in particular in a machine direction or in a cross-machine direction.

According to aspects of the disclosure, the first layer may be oriented further from the second layer between adjacent attachment positions of the plurality of attachment positions than the first layer is at each attachment position of the plurality of attachment positions between the first layer and the second layer.

According to aspects of the disclosure, the first layer may include corrugations across the second layer in a machine direction and/or in a cross-machine direction.

According to aspects of the disclosure, the extensible composite according to any aspect presented herein may include a second first layer, wherein the second first layer may have a second first layer first surface and a second first layer second surface opposing the second first layer first surface, the second first layer may include a non-woven material, and the second first layer may be attached to the second layer second surface.

According to aspects of the disclosure, the plurality of ribs may extend from the second layer first surface and the second layer second surface.

According to aspects of the disclosure, at least 50% of the plurality of ribs extending from the second layer first surface and at least 50% of the plurality of ribs extending from the second layer second surface may be aligned or offset with each other.

According to aspects of the disclosure, an adhesive may be included at each attachment position of the plurality of attachment positions of the plurality of attachment positions between the first layer and the second layer.

According to aspects of the disclosure, the extensible composite according to any aspect presented herein may include a fastening element configured to secure the extensible composite to at least a portion of the hygienic garment.

According to aspects of the disclosure, the second layer first surface including the plurality of ribs may have a density within a range of 0.20 to 15 ribs/cm in a view in a machine direction or in a view in a cross-machine direction, or a density within a range of 0.75 to 10 ribs/cm in a view in the machine direction or in a view in the cross-machine direction, or a density within a range of 1.0 to 7 ribs/cm in a view in the machine direction or in a view in the cross-machine direction.

According to aspects of the disclosure, the extensible composite according to any aspect presented herein may include at least an area devoid of the plurality of ribs, the area being arranged at one or more of the second layer first end and the second layer second end.

According to aspects of the disclosure, each rib of the plurality of ribs may have an aspect ratio (thickness/width in a view in one or more of a machine direction and a view in a cross-machine direction) within a range of 0.1 and 0.6, or an aspect ratio within a range of 0.15 and 0.5.

According to aspects of the disclosure, the extensible composite according to any aspect presented herein, and not in conflict with another aspect of the disclosure, the second first layer may be the same or different from the first layer, in particular when the second layer second surface may include a plurality of ribs.

According to aspects of the disclosure, the extensible composite according to any aspect presented herein may include the first layer and the second first layer being made of, respectively or inversely, a carded non-woven (e.g. a thermobonded carded non-woven) and a spunlace non-woven, a carded non-woven (e.g. a thermobonded carded non-woven) and a spunmelt non-woven (e.g. a spunbond non-woven), a spunlace non-woven and a spunlace non-woven, a spunmelt non-woven (e.g. a spunbond non-woven) and a spunlace non-woven, a spunmelt non-woven (e.g. a spunbond non-woven) and a spunmelt non-woven (e.g. a spunbond non-woven), or a carded non-woven (e.g. a thermobonded carded non-woven) and a carded non-woven (e.g. a thermobonded carded nonwoven).

Each of these combinations of nonwovens for the first layer and second first layer of may be more precisely extended to other non-woven described in the present application, in particular to another nonwoven of the same kind.

According to aspects of the disclosure, a roll including an unwinding direction and the extensible composite according to any aspect presented herein is provided, wherein the plurality of ribs extend in the unwinding direction. With such plurality of ribs, the extensible composite is less deformed in an undesired manner during winding, unwinding, and/or on a hygienic garment manufacturing apparatus. Additionally, with such plurality of ribs, the extensible composite that is arranged as roll has a decreased tendency to slip.

According to aspects of the disclosure, the extensible composite may include a third layer having a third layer first surface facing the second layer second surface and a third layer second surface opposing the third layer first surface, and the third layer may include a non-woven material.

According to aspects of the disclosure, a method of manufacturing an extensible composite is provided, in particular a method of manufacturing an extensible composite configured for use on a hygienic garment and/or the like is provided. The method includes providing a first layer having a first layer first surface and a first layer second surface opposing the first layer first surface, the first layer being constructed of a non-woven material, providing a second layer having a second layer first surface facing the first layer first surface and a second layer second surface opposing the second layer first surface, the second layer being constructed of an elastomeric material including a plurality of ribs extending from at least the second layer first surface, and attaching the first layer first surface to the second layer first surface at a plurality of attachment positions such that the first layer and the second layer are configured to define a space between the first layer first surface and the second layer first surface between adjacent attachment positions of the plurality of attachment positions.

According to aspects of the disclosure, the method may include attaching a second first layer to the second layer second surface.

In the manner described and according to aspects illustrated herein, the extensible composite and the method of manufacturing the extensible composite are capable of increasing adjustability, cushioning, texture, and absorbency of the hygienic garment, while also providing a visual indication of elongation of the extensible composite, in order to ensure comfortability and ease of use extensible composite and, thus, the hygienic garment.

BRIEF DESCRIPTION OF THE DRAWINGS

Aspects of an embodiment will be described in reference to the drawings, where like numerals reflect like elements:

FIG. 1A is a perspective view of an extensible composite according to aspects of the disclosure, depicting the extensible composite in use on a hygienic garment;

FIG. 1B is a schematic representation of the extensible composite according to FIG. 1A, according to aspects of the disclosure;

FIG. 2 is a perspective view of a part of the extensible composite according to FIG. 1A;

FIG. 3 is an exploded front view of a part of the extensible composite according to FIG. 1A;

FIG. 4A is a front cross-sectional view of a part of the extensible composite according to FIG. 1A;

FIG. 4B is a front cross-sectional view of a part of an alternative arrangement of the extensible composite according to FIG. 1A;

FIG. 5A is a top view of a part of the extensible composite according to FIG. 1A, depicting the extensible composite in a relaxed state;

FIG. 5B is a top view of a part of the extensible composite according to FIG. 1A, depicting the extensible composite in an extended state;

FIG. 6A is a schematic representation of an arrangement of a plurality of attachment positions and a plurality of ribs of a part of the extensible composite according to FIG. 1A, according to aspects of the disclosure; and FIG. 6B is a schematic representation of an alternative arrangement of the plurality of attachment positions and the plurality of ribs of a part of the extensible composite according to FIG. 1A, according to aspects of the disclosure.

DETAILED DESCRIPTION

An embodiment of an extensible composite and a method of manufacturing the extensible composite according to aspects of the disclosure will now be described with reference to FIGS. 1A-6B. Like numerals represent like parts, and the extensible composite will generally be referred to by the reference numeral 10. Although the extensible composite 10 is described with reference to specific examples, it should be understood that modifications and changes may be made to these examples without going beyond the general scope as defined by the claims. In particular, individual characteristics of the various embodiments shown and/or mentioned herein may be combined in additional embodiments.

Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," "third," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIG. 1A, the extensible composite 10 may be configured for use a hygienic garment (also may be referred to herein as a "disposable garment") 100. In particular, the hygienic garment 100 may be a diaper and/or the like configured to be worn as underwear about a midsection of a user, in order to collect, absorb, and/or contain a waste product of the user, so as to prevent soiling of outer clothing of the user and/or a surrounding environment of the user. To this end, the hygienic garment 100 includes an anterior portion 120, a posterior portion 140 opposing the anterior portion 120, an intermediate portion 160 connecting the anterior portion 120 and the posterior portion 140, and a waist band and/or waist flap portion 180 extending about an upper region of the anterior portion 120 and the posterior portion 140 so as to support the hygienic garment 100 about the midsection of the user. It is contemplated that the terms "anterior" and "posterior" may be understood with respect to a component, surface, position, region, direction, and/or the like that corresponds to an anterior and a posterior of the human anatomy. Further, it is contemplated that the terms "upper" and "lower" may be understood with respect to a component, surface, position, region, direction, and/or the like that corresponds to an upper region and a lower region of the human anatomy.

Referring to FIG. 1A, in examples, the extensible composite 10 may be located at or adjacent to the waist band and/or waist flap portion 180 of the hygienic garment 100. Additionally or alternatively, the extensible composite 10 may extend from one or more of the anterior portion 120 of the hygienic garment 100 and/or the posterior portion 140 of the hygienic garment 100 so as to be capable of fastening the anterior portion 120 of the hygienic garment 100 to the posterior portion 140 of the hygienic garment 100. To this end, the extensible composite 10 may include a fastening element 15 configured to mate with one or more of the anterior portion 120 of the hygienic garment 100, the posterior portion 140 of the hygienic garment 100, and/or a complimentary fastening element 115 included on one or more of the anterior portion 120 of the hygienic garment 100 and/or the posterior portion 140 of the hygienic garment 100. It is contemplated that the fastening element 15 of the extensible composite 10 may include any kind of fastening mechanism that may be compatible with the extensible composite 10, such as a hook-and-loop fastening mechanism (see FIG. 1A), an adhesive fastening mechanism (see FIG. 1B), and/or the like. In particular, the fastening element 15 may include hooks and the complimentary fastening element 115 may include loops. Alternatively, the extensible composite 10 may include the fastening element 15 configured to mate directly with at least the anterior portion 120 of the hygienic garment 100, which forms the complimentary fastening element 115, e.g., forming loops. Additionally or alternatively, the extensible composite 10 may be a part of the waist band and/or waist flap portion 180 of the hygienic garment 100, thereby extending, uninterrupted, throughout the anterior portion 120 of the hygienic garment 100 and the posterior portion 140 of the hygienic garment 100. In this manner, they extensible composite 10 is configured to allow for fastening of the hygienic garment 100 about the midsection of the user and/or sliding of the hygienic garment 100 up to the midsection of the user, to provide a secure and adjustable fit of the extensible composite 10 and, thus, the hygienic garment 100 about the midsection of the user. Additionally or alternatively, the fastening element 15, as hook layer, may be directly laminated on the first layer 20 and/or on the second first layer 20, without adhesive.

As illustrated by FIGS. 5A-5B, the extensible composite 10 is configured to extend and contract between a relaxed state (see FIG. 5A) and an extended state (it is contemplated that the extended state of the extensible composite 10 may correspond to an elongation of the extensible composite of 100%. For example, if the extensible composite 10 has a dimension of L0 at relaxed state, an elongation of the extensible composite of 100% corresponds to a dimension of the extensible composite 10 of L0+100% of L0=2*L0)(see FIG. 5B). In particular, the extensible composite 10 is configured to extend from the relaxed state toward the extended state and to contract from the extended state toward the relaxed state. To this end, referring to FIGS. 1B-4B, the extensible composite 10 includes at least two layers 20, 40 capable of extending and contracting together. In examples, the extensible composite 10 includes a first layer 20 and a second layer 40. In particular, the extensible composite 10 may include one or more of the first layer 20 and one or more of the second layer 40. In examples, the extensible composite 10 may include the first layer 20, a second first layer (also may be referred to herein as a "third layer") 20, and one second layer 40; however, as the structures and/or relationships corresponding to the first layer 20 and the second first layer 20 are the same, or substantially the same, the first layer 20 and the second first layer 20 will be referred to herein collectively as "the first layer 20," unless discussion of the second first layer 20 is otherwise necessary.

For example, the second layer 40 may be a material that retains a residual deformation or remanence after elongation and release (a residual deformation may also be referred to herein as a "permanent set" and/or "SET") of less than 30%, or less than 20%, or less than 15%, or less than 10%, or less than 5%, of an initial dimension (i.e. before elongation) for an elongation of the extensible composite 10 of 100% of the initial dimension, at room temperature (i.e. 23° C.). The SET may be measured as indicated in European Patent Application Publication No. EP1783257, the content of which is incorporated by reference, and in particular to paragraphs [0056] to [0062] of European Patent Application Publication No. EP1783257, which details an example of a SET measurement.

Referring to FIGS. 1B-4B, the first layer 20 of the extensible composite 10 includes a first layer first surface 22 and a first layer second surface 24 opposing the first layer first surface 22. As such, it should be understood that the second first layer 20 includes a second first layer first surface 22 and a second first layer second surface 24 opposing the second first layer first surface 22. In examples, the first layer 20 is constructed from a non-woven material. It is contemplated that the term "non-woven" as used herein may be understood to be a fabric-like material including fibers and/or filaments bonded and/or entangled together chemically, mechanically, thermally, and/or the like, which are not woven or knitted together. For example, the non-woven material of the first layer 20 or the second first layer 20 may be any non-woven material that may be compatible with the extensible composite 10, such as a melt-blown non-woven material, point-bonded non-woven material, carded non-woven material, spunlaced non-woven material, spunbond non-woven material, spunmelt non-woven material (i.e. an SMS-type non-woven (see below)), a non-woven material selected from a group including of SM, SMS, SSMMS, SMSMS, SMMMS, SMMS, SSMMSS, SSMMMSS, SSMMMSSS, and/or any other combination of "S" and "M" layers ("S" representing a spunbond-type layer and "M" representing a meltblown-type layer), and/or the like. Additionally or alternatively, the non-woven material may include crimped fibers such as crimped carded fibers or crimped spunbond fibers of a same material or of two different materials of a same kind of material or of two different materials of a different kind of material (i.e. a bi-component material). It is contemplated that the fibers of the non-woven material may be of any material that may be compatible with the extensible composite 10, such as polyester (i.e., PET), polyolefin (i.e., PP), polyethylene (i.e., PE), polyamide (i.e., PA), acrylonitrile butadiene styrene (i.e., ABS), acrylic, polystyrene (i.e., PS), cellulosic, fluorocarbon, polylactic acid (i.e., PLA), a blend thereof, and/or the like. In examples, the non-woven material of the first layer 20 may have a basis weight in the range of 1 $g/m^2$ to 50 $g/m^2$. In particular, the non-woven material of the first layer 20 may have a basis weight in the range of 4 $g/m^2$ to 35 $g/m^2$. The non-woven material of the first layer 20 may be extensible in a cross-machine direction. To this end, the non-woven material of the first layer 20 and/or of the second first layer 20 may have a cross-machine direction extension at peak load of at least 100%. It is contemplated that the non-woven material of the first layer 20 may be extensible in a machine direction. To this end, the non-woven material of the first layer 20 may have a cross-machine direction/machine direction elongation ratio of at least 1:1, at least 2:1, at least 3:1, in a range of 3-6:1, or in a range of 4-5:1. In this manner, the first layer 20 is inelastic but highly extensible, thereby allowing for extension and contraction of the extensible composite 10 between the relaxed state and the extended state. The non-woven material of the first layer 20 and/or of the second first layer 20 may be the same or different of any combination described in herein.

Referring to FIGS. 1B-4B, the second layer 40 of the extensible composite 10 includes a second layer first surface 42 and a second layer second surface 44 opposing the second layer first surface 42. Additionally, the second layer 40 extends between a second layer first end 46 and a second layer second end 48. It is contemplated that the second layer first end 46 and the second layer second end 48 may define and/or correspond to the machine direction or the cross-machine direction. In examples, the second layer 40 is constructed from an elastomeric material. It is contemplated that the term "elastomeric" as used herein may be understood to be any polymeric material having elasticity. For example, the elastomeric material of the second layer 40 may be any elastomeric material that may be compatible with the extensible composite 10, such as a styrenic block copolymer, which may include, as a primary component, styrene-isoprene-styrene (i.e., SIS) block copolymers, styrene-butadiene-styrene (i.e., SBS) block copolymers, styrene-ethylene-butylene-styrene (i.e., SEBS) and styrene-ethylene-propylene-styrene (i.e., SEPS), and/or a combination thereof. Additionally, the elastomeric material of the second layer 40 may include an additional material as a secondary component, such as polyethylene (i.e., PE), polypropylene (i.e., PP), polystyrene (i.e., PS), and/or a combination thereof. In examples, the elastomeric material of the second layer 40 may have a basis weight of 30 $g/m^2$ to 100 $g/m^2$. In particular, the elastomeric material of the second layer 40 may have a basis weight of 35 $g/m^2$ to 65 $g/m^2$. Further, the elastomeric material of the second layer 40 may have a cross-machine direction elongation of at least 100%. In this manner, the second layer 40 is elastic and highly extensible, thereby allowing for extension and contraction of the extensible composite 10 between the relaxed state and the extended state. As shown in FIG. 1B, the extensible composites 10 of FIG. 1A are obtained by a cutting along a cutting line Lc. Alternatively, depending on the application, for example, for adult incontinence, the extensible composite 10 may include one or more second layer 40 including an elastic film, as illustrated by FIG. 1B.

As shown in FIGS. 1B-4B, the second layer 40 includes a plurality of ribs 50 extending from at least the second layer first surface 42. It is contemplated that the plurality of ribs 50 may extend from the second layer first surface 42 and the second layer second surface 44. It is contemplated that the plurality of ribs 50 extending from the second layer second surface 44 may be aligned with and/or offset from the plurality of ribs 50 extending from the second layer first surface 42. The plurality of ribs 50 may be integrally formed on the second layer 40, such that the plurality of ribs 50 extend from the second layer 40 contiguously, in one piece. As such, during manufacture of the second layer 40, it is contemplated that the plurality of ribs 50 may be extruded together with the second layer 40 through a die (not shown), such that the plurality of ribs 50 are integrally formed on the second layer 40. It is contemplated that the plurality of ribs 50 may include any shape that may be compatible with the extensible composite 10, such as cylindrical, trapezoidal, triangular prism, and/or the like. In examples, the plurality of ribs 50 extend in a machine direction, which may be parallel, or substantially parallel, to the second layer first end 46 and the second layer second end 48. Additionally, the plurality of ribs 50 extend continuously throughout the second layer 40 between the second layer first end 46 and the second layer second end 48.

Referring to FIGS. 1B-4B, a gap 52 extends between each rib 50 of the plurality of ribs 50 and an adjacent rib 50 of the plurality of ribs 50. In examples, adjacent ribs 50 of the plurality of ribs 50 are spaced apart from each other such that each gap 52 represents a mean distance (width) between adjacent ribs 50 of the plurality of ribs 50 that is within a range of 0.1 mm and 20 mm. In particular, adjacent ribs 50 of the plurality of ribs 50 may be spaced apart from each other such that each gap 52 represents a mean distance (width) between adjacent ribs 50 of the plurality of ribs 50 that is within a range of 0.2 mm and 15 mm, particularly after an elongation of the extensible composite 10 of 100%. It is contemplated that spacing between adjacent ribs 50 of the plurality of ribs 50 (i.e. the width of the gaps 52) may be graduated, such that spacing between adjacent ribs 50 of the plurality of ribs 50 increases from a center of the second layer 40 toward the second layer first end 46 and the second layer second end 48, respectively. In particular, spacing between adjacent ribs 50 of the plurality of ribs 50 may increase within a range of 25% to 100% from the center of the second layer 40 toward the second layer first end 46 and the second layer second end 48, respectively. Accordingly, visibility of the plurality of ribs 50 is increased toward the center of the second layer 40 in the extended state, for example, of 100% or 200%.

In examples, the second layer 40 has a first thickness within each gap 52 between adjacent ribs 50 of the plurality of ribs 50 and a second thickness along each rib 50 of the plurality of ribs 50 when the extensible composite 10 is in the relaxed state (initial or not) and/or in the extended state with an elongation of the extensible composite 10 of 100% in the machine direction and/or in the cross-machine direction. Further, the second thickness of the second layer 40 along each rib 50 of the plurality of ribs 50 is greater than the first thickness of the second layer 40 between adjacent ribs 50 of the plurality of ribs 50 when the extensible composite 10 is in the relaxed state (initial or not) and/or in the extended state with an elongation of 100% of the extensible composite 10 in the machine direction and/or in the cross-machine direction. In examples, the first thickness of the second layer 40 is within a range of 0.025 mm and 0.075 mm when the extensible composite 10 is in the relaxed state (initial or not) and/or in the extended state with an elongation of 100% of the extensible composite 10 in the machine direction and/or in the cross-machine direction. In examples, the second thickness of the second layer 40 is within a range of 0.125 mm to 0.2 mm when the extensible composite 10 is in the relaxed state (initial or not) and/or in the extended state with an elongation of 100% of the extensible composite in the machine direction and/or in the cross-machine direction. In particular, the second thickness of the second layer 40 along each rib 50 of the plurality of ribs 50 may be greater than the first thickness of the second layer 40 between adjacent ribs 50 of the plurality of ribs 50 when the extensible composite 10 is in the relaxed state. In examples, the first thickness of the second layer 40 between adjacent ribs 50 of the plurality of ribs 50 is within a range of 10% to 50% of the second thickness of the second layer 40 along each rib 50 of the plurality of ribs 50, particularly when the extensible composite 10 is in the relaxed state. In particular, the first thickness of the second layer 40 between adjacent ribs 50 of the plurality of ribs 50 may be within a range of 20% to 45% of the second thickness of the second layer 40 along each rib 50 of the plurality of ribs 50, particularly when the extensible composite 10 is in the relaxed state. In this manner, due to the first (reduced) thickness of the second layer 40 within each gap 52 of the second layer 40, the second layer 40 and, thus, the extensible composite 10, has different areas of extensibility and a locally increased extensibility. Additionally, due to the second (increased) thickness of the second layer 40 along each rib 50 of the plurality of ribs 50, the plurality of ribs 50 have increased visibility through the first layer 20 and the second layer 40 and, thus, the extensible composite 10, has increased structural integrity, and notably has increased resistance to a force applied in a same direction of a main direction of the plurality of ribs 50. It is contemplated that the initial relaxed state of the extensible composite 10 may correspond to the extensible composite 10 as first produced and/or retrieved by the manufacturing apparatus of the extensible composite 10, and/or from a roll, and/or from the hygienic garment 100, i.e., without any elongation of the extensible composite 10 when first used or tested.

As illustrated by FIGS. 5A-5B, the extensible composite 10 is configured to extend and contract between the relaxed state and the extended state. In examples, a first mean distance (width) between adjacent ribs 50 of the plurality of ribs 50 (i.e. a first mean distance of the gaps 52 of the second layer 40) in the relaxed state of the extensible composite 10 is less than a second mean distance between adjacent ribs 50 of the plurality of ribs 50 (i.e. a second mean distance of the gaps 52 of the second layer 40) in the extended state of the extensible composite 10. In particular, the first mean distance between adjacent ribs 50 of the plurality of ribs 50 is within a range of 0.5 mm to 30 mm in the relaxed state of the extensible composite 10. Additionally, the second mean distance between adjacent ribs 50 of the plurality of ribs 50 in the extended state with an elongation of 100% of the extensible composite 10 is within a range of 100% to 200% of the first mean distance between adjacent ribs 50 of the plurality of ribs 50, particularly within a range of 105% to 170% of the first mean distance between adjacent ribs 50 of the plurality of ribs 50, and more particularly within a range of 105% to 150% of the first mean distance between adjacent ribs 50 of the plurality of ribs 50. In this manner, a user is able to visualize a change and/or increase in spacing between adjacent ribs 50 of the plurality of ribs 50, thereby obtaining a clear visual indication of a rate and/or amount of elongation of the extensible composite 10. Accordingly, the user may more accurately adjust a sizing of the extensible composite 10 and, thus, the hygienic garment 100 and/or reduce a risk of extension of the extensible composite 10 beyond a predetermined range of elongation to prevent breakage of the extensible composite 10 and, thus, the hygienic garment 100. Additionally or alternatively, it is contemplated that the second layer 40 may include a plurality of stripes (not shown), similar to the arrangement of the plurality of ribs 50, in addition to or alternative to the plurality of ribs 50, thereby also allowing the user to visualize a change and/or increase in spacing between adjacent stripes of the plurality of stripes, thereby obtaining a clear visual indication of a rate and/or amount of elongation of the extensible composite 10.

As shown in FIGS. 1B-6B, the first layer 20 is arranged to face the second layer 40. In particular, the first layer first surface 22 is arranged to face the second layer first surface 42. In examples, at least a portion of the first layer first surface 22 is attached to the second layer first surface 42. To this end, the first layer first surface 22 is attached to the second layer first surface 42 at a plurality of attachment positions 26. Additionally or alternatively, the second first layer 20 may be arranged to face the second layer 40. In particular, the second first layer 20 may be arranged to face the second layer second surface 44. In examples, at least a portion of the second first layer 20 may be attached to the second layer second surface 44 in the same manner that the first layer 20 is attached to the second layer first surface 42. In this manner, the first layer 20, the second first layer 20, and the second layer 40 are arranged in a sandwiched configuration, with the second layer 40 arranged between the first layer 20 and the second first layer 20.

In examples, each attachment position 26 of the plurality of attachment positions 26 may be spaced apart from an adjacent attachment position 26 of the plurality of attachment positions 26 at a mean distance (width) within a range of 0.5 mm to 5.0 mm. In particular, each attachment position 26 of the plurality of attachment positions 26 may be spaced apart from an adjacent attachment position 26 of the plurality of attachment positions 26 at a mean distance (width) within a range of 1.5 mm to 4.5 mm, and more particularly within a range of 2.5 mm to 4.0 mm. At each attachment position 26, the first layer first surface 22 may be adhesively bonded to the second layer first surface 42. To this end, a bead of adhesive may bond the first layer first surface 22 to the second layer first surface 42 at each attachment position 26. As shown in FIG. 1B, one or more bead of adhesive may be included as part of an adhesive layer 30. However, it is contemplated that the first layer first surface 22 may be attached to the second layer first surface 42 at each attachment position 26 of the plurality of attachment positions 26 through any alternative attachment method that may be compatible with the extensible composite 10, such as direct lamination, thermal bonding, ultrasonic bonding, and/or infrared bonding.

As shown by FIGS. 1B-6B, between each attachment position 26 of the plurality of attachment positions 26 and an adjacent attachment position 26 of the plurality of attachment positions 26, a space 28 is defined between the first layer first surface 22 and the second layer first surface 42. As such, the first layer 20 is oriented further from the second layer 40 between adjacent attachment positions 26 than the first layer 20 is at each attachment position 26. As the first layer 20 is oriented further from the second layer 40 between adjacent attachment positions 26 than the first layer 20 is at each attachment position 26, the first layer 20 includes corrugations and/or ripples across the second layer 40, between the second layer first end 46 and the second layer second end 48. In particular, the first layer 20 includes corrugations and/or ripples across the second layer 40 when the extensible composite 10 is in the relaxed state, after an elongation of the extensible composite 10 between 50% and 200%, more particularly in the relaxed state, after an elongation of the extensible composite 10 of 100%. In this manner, the spaces 28 defined between the first layer 20 and the second layer 40, which form the corrugations of the first layer 20, allow for increased compressibility of the first layer 20, thereby increasing a visual perception of softness due to changes in thickness and/or texture of the extensible composite 10 and/or a potential feeling of cushioning and/or softness of the first layer 20 to enhance comfort of the extensible composite 10 and, thus, the hygienic garment 100. Additionally, it is contemplated that the plurality of ribs 50 are capable of accentuating the corrugations of the first layer 20, thereby further increasing cushioning and/or softness of the first layer 20 to enhance comfort of the extensible composite 10 and, thus, the hygienic garment 100.

Referring to FIGS. 1B-6B, one or more attachment position 26 of the plurality of attachment positions 26 may be located between adjacent ribs 50 of the plurality of ribs 50 (i.e. within at least a portion of a gap 52 of the second layer 40). Attaching the first layer 20 to the second layer 40 at one or more attachment position 26 of the plurality of attachment positions 26 located between adjacent ribs 50 of the plurality of ribs 50 allows for an increased volume of the first layer 20 and/or enhanced formation of the corrugations of the first layer 20, allowing for increased compressibility of the first layer 20, thereby increasing cushioning and/or softness of the first layer 20 to enhance comfort of the extensible composite 10. However, attaching the first layer 20 to the second layer 40 at one or more attachment position 26 of the plurality of attachment positions 26 located between adjacent ribs 50 of the plurality of ribs 50 may reduce elasticity of the second layer 40, as attachment of the first layer 20 to the second layer 40 may increase rigidity at the one or more attachment position 26, where elasticity would have been higher (i.e. an area corresponding to a gap 52 of the second layer 40), as contrasted with an area of the second layer 40 with increased thickness (i.e. an area corresponding to a rib 50 of the plurality of ribs 50), thereby reducing extensibility of the extensible composite 10.

Additionally or alternatively, one or more attachment position 26 of the plurality of attachment positions 26 may be located along at least a portion of one or more rib 50 of the plurality of ribs 50. Attaching the first layer 20 to the second layer 40 at one or more attachment position 26 of the plurality of attachment positions 26 located along one or more rib 50 of the plurality of ribs 50 allows for increased elasticity of the second layer 40, as the one or more attachment position 26 of the plurality of attachment positions 26 does not increase rigidity at an area of increased elasticity (i.e. an area corresponding to a gap 52 of the second layer 40). However, attaching the first layer 20 to the second layer 40 at one or more attachment position 26 of the plurality of attachment positions 26 located along one or more rib 50 of the plurality of ribs 50 may increase tension of the first layer 20 and reduce the volume of the first layer 20 and/or the formation of corrugations of the first layer 20 (i.e. flattening the first layer 20), decreasing compressibility of the first layer 20, thereby decreasing cushioning and/or softness of the first layer 20 and reducing comfort of the extensible composite 10.

In examples, one or more attachment position 26 of the plurality of attachment positions 26 is located between adjacent ribs 50 of the plurality of ribs 50 and one or more attachment position 26 of the plurality of attachment positions 26 is located along one or more rib 50 of the plurality of ribs 50. Additionally or alternatively, more than one attachment position 26 of the plurality of attachment positions 26 is located between adjacent ribs 50 of the plurality of ribs 50 and more than one attachment position 26 of the plurality of attachment positions 26 is located along one or more rib 50 of the plurality of ribs 50. In examples, at least 5% to 40% of the plurality of attachment positions 26 may be located between adjacent ribs 50 of the plurality of ribs 50. In particular, at least 5% to 15% of the plurality of attachment positions 26 may be located between adjacent ribs 50 of the plurality of ribs 50. Additionally or alternatively, at least 1% to 10% of the plurality of attachment positions 26 may be located along a rib 50 of the plurality of ribs 50. In particular, at least 1% to 5% of the plurality of attachment positions 26 may be located along a rib 50 of the plurality of ribs 50. In this manner, including hybrid attachment positions 26 located between adjacent ribs 50 of the plurality of ribs 50 and along one or more rib 50 of the plurality of ribs 50, more volume of the first layer 20 and more elasticity between adjacent ribs 50 of the plurality of ribs 50 are maintained, thereby allowing for increased extensibility and comfort of the extensible composite 10 and, thus, the hygienic garment 100. Referring to FIGS. 6A-6B, each attachment position 26 of the plurality of attachment positions 26 may be obtained by using adhesive, ultrasonic, calendaring, and/or combination thereof. The attachment positions 26 may be different depending of the area of the extensible composite 10 (see FIG. 1B) with beads extending in the machine direction (preferably extending continuously in the machine direction) in a central region of the second layer 40 and continuously in the cross-machine direction both outside of the area of the second layer 40 and in borders of the second layer 40.

Additionally or alternatively, the extensible composite 10 may be configured to be activated. An activation may be an incremental stretching of the extensible composite 10 by, for example, a ring-roller, see, for example, United States Patent Application Publication No. 2014/0378924 and/or International Application Publication No. WO2019/086344, the content of each being incorporated by reference. An amount of activation, measured as an applied strain (see United States Patent Application Publication No. 2014/0378924 and/or International Application Publication No. WO2019/086344), may be within a range of 10 to 250%, in particular within a range of 50% to 190%. As shown in FIGS. 1A-1B, the two extensible composites 10 are activated in an activated area 60 having a width that is less than a width of each of the second layers 40.

Additionally or alternatively, the first layer 20 and/or the second first layer 20 of the extensible composite 10 may be activated prior to lamination with the second layer 40. The activation may be an incremental stretching of the extensible composite 10 by, for example, a ring-roller, see, for example, United States Patent Application Publication No. 2014/0378924 and/or International Application Publication No. WO2019/086344, the content of each being incorporated by reference. An amount of activation, measured as applied strain (see United States Patent Application Publication No. 2014/0378924 and/or International Application Publication No. WO2019/086344), may be within a range of 1% to 200%, in particular within a range of 5% to 120%, and more particularly within a range of 10% to 100%.

Additionally or alternatively, the first layer 20 and/or the second first layer 20 of the extensible composite 10 may be shaped prior to lamination with the second layer 40, for example, being wave-shaped in the machine direction and/or the cross-machine direction for forming corrugations.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. An extensible composite comprising:
a first layer including a first layer first surface and a first layer second surface opposing the first layer first surface, the first layer comprising a non-woven material; and
a second layer including a second layer first surface facing the first layer first surface and a second layer second surface opposing the second layer first surface, the second layer comprising an elastomeric material;
wherein the second layer includes a plurality of ribs extending from at least the second layer first surface; and
wherein at least a portion of the first layer first surface is attached to the second layer first surface at a plurality of attachment positions and the first layer and the second layer are configured to define a space between the first layer first surface and the second layer first surface between adjacent attachment positions of the plurality of attachment positions.

2. The extensible composite according to claim 1, wherein the first layer and the second layer are configured to extend and contract between a relaxed state and an extended state.

3. The extensible composite according to claim 2, wherein the first layer includes a first mean distance between adjacent ribs of the plurality of ribs in the relaxed state, the first layer includes a second mean distance between adjacent ribs of the plurality of ribs in the extended state, and the second mean distance between adjacent ribs of the plurality of ribs is greater than the first mean distance between adjacent ribs of the plurality of ribs.

4. The extensible composite according to claim 1, wherein a gap extends between adjacent ribs of the plurality of ribs of the second layer.

5. The extensible composite according to claim 4, wherein the second layer has a first thickness within each gap of the second layer and a second thickness along each rib of the plurality of ribs of the second layer, and the second thickness along each rib of the plurality of ribs of the second layer is greater than the first thickness within each gap of the second layer.

6. The extensible composite according to claim 5, wherein the first thickness of the second layer within each gap of the second layer is within a range of 10% to 50% of the second thickness of the second layer along each rib of the plurality of ribs of the second layer.

7. The extensible composite according to claim 1, wherein one or more attachment position of the plurality of attachment positions is located between adjacent ribs of the plurality of ribs of the second layer.

8. The extensible composite according to claim 7, wherein at least 5% to 40% of the plurality of attachment positions are located between adjacent ribs of the plurality of ribs of the second layer.

9. The extensible composite according to claim 1, wherein one or more attachment position of the plurality of attachment positions is located along at least a portion of one or more rib of the plurality of ribs of the second layer.

10. The extensible composite according to claim 9, wherein at least 1% to 10% of the plurality of attachment positions are located along at least a portion of a rib of the plurality of ribs of the second layer.

11. The extensible composite according to claim 1, wherein one or more attachment position of the plurality of attachment positions is located between adjacent ribs of the plurality of ribs of the second layer and one or more attachment position of the plurality of attachment positions is located along at least a portion of one or more rib of the plurality of ribs of the second layer.

12. The extensible composite according to claim 1, wherein, in a cross-section in a plane perpendicular to a machine direction or cross-machine direction, at least 1% of the plurality of attachment positions are located along at least a portion of a rib of the plurality of ribs of the second layer and up to 99% of the plurality of attachment positions are located between adjacent ribs of the plurality of ribs of the second layer.

13. The extensible composite according to claim 1, wherein, in a cross-section in a plane perpendicular to a machine direction or a cross-machine direction, up to 20% of the plurality of attachment positions are located along at least a portion of a rib of the plurality of ribs of the second layer and at least 80% of the plurality of attachment positions are located between adjacent ribs of the plurality of ribs of the second layer.

14. The extensible composite according to claim 1, wherein the second layer includes a second layer first end and a second layer second end and the plurality of ribs of the second layer extend continuously throughout the second layer between the second layer first end and the second layer second end.

15. The extensible composite according to claim 1, wherein the first layer is oriented further from the second layer between adjacent attachment positions of the plurality of attachment positions than the first layer is at each attachment position of the plurality of attachment positions.

16. The extensible composite according to claim 1, wherein the first layer includes corrugations across the second layer.

17. The extensible composite according to claim 1, comprising a second first layer, wherein the second first layer is attached to the second layer second surface.

18. The extensible composite according to claim 1, wherein the plurality of ribs extend from the second layer first surface and the second layer second surface.

19. The extensible composite according to claim 18, wherein at least 50% of the plurality of ribs extending from the second layer first surface and at least 50% of the plurality of ribs extending from the second layer second surface are aligned or offset with each other.

20. The extensible composite according to claim 1, comprising an adhesive at each attachment position of the plurality of attachment positions.

21. The extensible composite according to claim 1, comprising a fastening element configured to secure the extensible composite to at least a portion of a hygienic garment.

22. The extensible composite according to claim 1, wherein the second layer first surface including the plurality of ribs has a density within a range of 0.20 to 15 ribs/cm in a machine direction or in a cross-machine direction.

23. The extensible composite according to claim 1, comprising at least an area devoid of the plurality of ribs, the area being arranged at one or more of a second layer first end and a second layer second end.

24. The extensible composite according claim 1, wherein each rib of the plurality of ribs has an aspect ratio within a range of 0.1 and 0.6.

25. A roll comprising:
an unwinding direction; and
an extensible composite;
wherein the extensible composite comprises:
 a first layer including a first layer first surface and a first layer second surface opposing the first layer first surface, the first layer comprising a non-woven material; and
 a second layer including a second layer first surface facing the first layer first surface and a second layer second surface opposing the second layer first surface, the second layer comprising an elastomeric material;
 wherein the second layer includes a plurality of ribs extending from at least the second layer first surface; and
 wherein at least a portion of the first layer first surface is attached to the second layer first surface at a plurality of attachment positions and the first layer and the second layer are configured to define a space between the first layer first surface and the second layer first surface between adjacent attachment positions of the plurality of attachment positions;
wherein the plurality of ribs extend in the unwinding direction.

26. A method of manufacturing an extensible composite, the method comprising:
providing a first layer including a first layer first surface and a first layer second surface opposing the first layer first surface, the first layer being constructed of a non-woven material;
providing a second layer including a second layer first surface facing the first layer first surface and a second layer second surface opposing the second layer first surface, the second layer being constructed of an elastomeric material including a plurality of ribs extending from at least the second layer first surface; and
attaching the first layer first surface to the second layer first surface at a plurality of attachment positions such that the first layer and the second layer are configured to define a space between the first layer first surface and the second layer first surface between adjacent attachment positions of the plurality of attachment positions.

27. The method according to claim 26, further comprising attaching a second first layer to the second layer second surface.

* * * * *